United States Patent [19]

Gams, Jr. et al.

[11] Patent Number: 5,451,110

[45] Date of Patent: Sep. 19, 1995

[54] BEARING WEAR INDICATOR

[75] Inventors: Ferdinand L. Gams, Jr., Eveleth, Minn.; Donald J. Polinski, Neenah, Wis.

[73] Assignee: Syedala Industries, Inc., Waukesha, Wis.

[21] Appl. No.: 175,219

[22] Filed: Dec. 28, 1993

[51] Int. Cl.$^6$ .................... F16C 41/00; G01D 21/00
[52] U.S. Cl. ........................ 384/624; 116/208
[58] Field of Search ............. 384/8, 448, 624; 116/208

[56] References Cited

U.S. PATENT DOCUMENTS

| | | | |
|---|---|---|---|
| 1,662,901 | 3/1928 | Ripley | 116/208 X |
| 3,228,735 | 1/1966 | St4ewart | 116/208 X |
| 3,678,883 | 7/1972 | Fischer | 116/208 |
| 3,797,896 | 3/1974 | Bordach | 384/8 |
| 3,897,116 | 7/1975 | Carpenter | 384/624 X |

Primary Examiner—Thomas R. Hannon
Attorney, Agent, or Firm—Kinney & Lange

[57] ABSTRACT

The bearing assembly for supporting and guiding a moving member includes a first bearing member and a second bearing member. The second bearing member and the first bearing member have movement relative to one another. The second bearing member includes a wearing surface in contact with the first bearing member. The wearing surface wears in response to the relative movement between the first and second bearing members. The second bearing member also includes a chamber and a wear identifier. The chamber is located behind the wearing surface. The wear identifier is within the chamber. Upon sufficient wear of the wearing surface, the wear identifier is released from the chamber onto the wearing surface.

25 Claims, 3 Drawing Sheets

BEARING WEAR INDICATOR

BACKGROUND OF THE INVENTION

The present invention relates to machine bearings. In particular, the present invention relates to a bearing member having a wear identifier filled cavity behind the wearing surface, whereupon sufficient wear of the wearing surface, the wear identifier is released from the cavity onto the wearing surface and into lubricant to indicate excessive wear.

Machine bearings come in a variety of different forms and shapes and are used in a wide range of machines. Machine bearings act as a support and a guide for rotating, oscillating or sliding elements. Machine bearings typically include at least two members which move relative to one another. These members progressively wear down during operation of the machine. To prevent catastrophic failure, it is necessary to detect exactly which members are worn out and require replacement.

Unfortunately, detecting and evaluating the extent of wear upon the bearing members is time-consuming and expensive. Wear conditions of bearing members have been conventionally determined by physical inspection and dimensional analysis of the various machine components. This method of determining the extent of wear upon the bearing members requires dismantling of the machine. As a result, the particular machine under inspection also has to be taken out of service. Because of the time and cost required for routine inspection of internal components, inspections are not always performed in a timely manner. This lack of timely inspection increases the risk of excessive wear and catastrophic failure.

SUMMARY OF THE INVENTION

The present invention is an improved machine bearing assembly. The bearing assembly for supporting and guiding a moving member includes a first bearing member and a second bearing member. The second bearing member and the first bearing member have movement relative to one another. The second bearing member includes a wearing surface in contact with the first bearing member. The wearing surface wears in response to the relative movement between the first and second bearing members. The second bearing member also includes a chamber and a wear identifier. The chamber is located behind the wearing surface. The wear identifier is within the chamber. Upon sufficient wear of the wearing surface, the wear identifier is released from the chamber onto the wearing surface. As a result, excessive wear upon a wearing surface is quickly and easily detected.

DETAILED DESCRIPTION OF THE PREFERRED EMBODIMENTS

Figure 1:
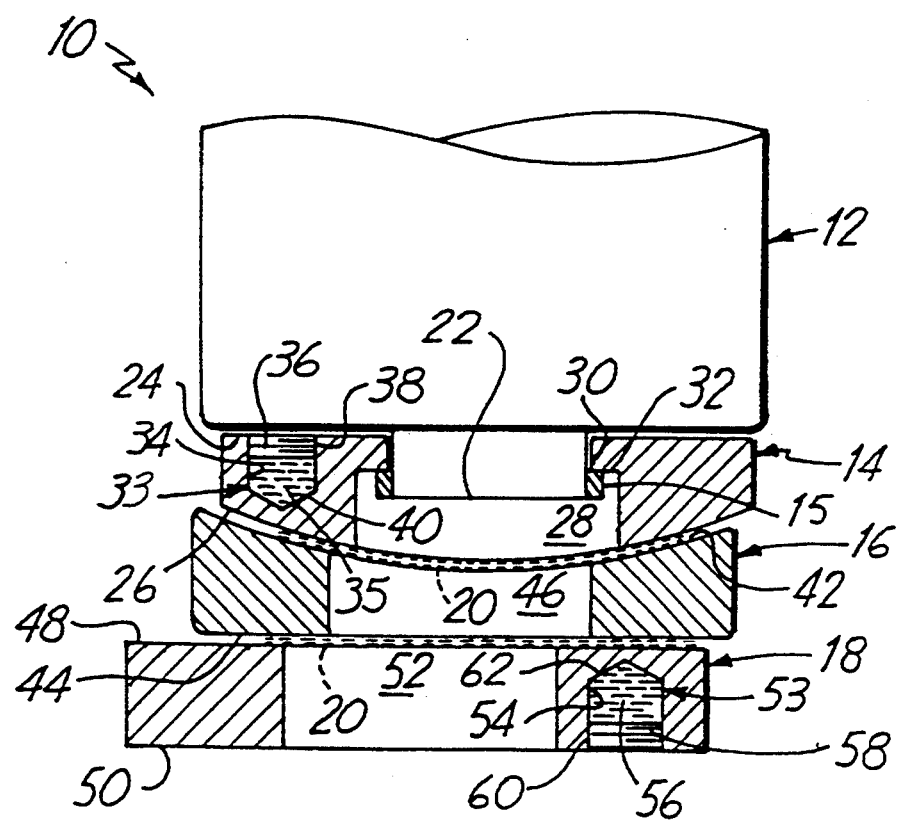
FIG. 1 is a cross-sectional view of a step bearing assembly including bearing wear indicators of the present invention.

FIG. 1 is a cross-sectional view of step bearing assembly 10. Step bearing assembly 10 includes shaft 12, shaft step 14, step washer 16, piston-wearing plate 18 and lubricant 20. Shaft 12 is generally cylindrical and includes lug 22. Lug 22 projects from a lower end of shaft 12. Lug 22 extends into shaft step 14 and permits shaft step 14 to be mounted to shaft 12.

Shaft step 14 is mounted to shaft 12 between shaft 12 and step washer 16. Shaft step 14 includes non-wearing surface 24, wearing surface 26, lower bore 28, central hole 30, shoulder 32 and wear indicator 33. Non-wearing surface 24 is a generally flat surface opposite of wearing surface 26. Non-wearing surface 24 abuts a lower end of shaft 12. Wearing surface 26 is a generally curved surface. Wearing surface 26 contacts, and at times, is in frictional engagement with step washer 16.

Lower bore 28 extends into shaft step 14 from wearing surface 26 toward non-wearing surface 24. Lower bore 28 has an outer diameter which narrows toward an upper end of lower bore 28 to form central hole 30 and shoulder 32. Central hole 30 extends from non-wearing surface 24 toward wearing surface 26. Central hole 30 is in communication with lower bore 28. Lug 22 protrudes through central hole 30 into lower bore 28. Retainer ring 15 is fixedly coupled to the lower end of lug 22 within lower bore 28. Retainer ring 15 engages shoulder 32 of shaft step 14 to couple shaft 12 to shaft step 14.

Wear indicator 33 includes cavity or chamber 34, wear identifier 35 and plug 36. Chamber 34 extends into shaft step 14 from non-wearing surface 24 toward wearing surface 26. Chamber 34 includes an upper end 38 and a lower end 40. Upper end 38 is positioned adjacent non-wearing surface 24. Lower end 40 is preferably conical-shaped, having a point toward wearing surface 26. Chamber 34 is positioned behind wearing surface 26. Lower end 40 of chamber 34 is positioned behind wearing surface 26 at a predetermined distance less than a distance behind wearing surface 26 at which catastrophic failure of bearing assembly 10 would occur. Chamber 34 contains wear identifier 35.

Wear identifier 35 preferably consists of a powerful dye. Alternatively, wear identifier 35 consists of a chemical or other foreign material. Wear identifier 35 has a different color or chemical composition than lubricant 20. As a result, wear identifier 35 is distinguishable from lubricant 20.

Plug 36 engages upper end 38 of chamber 34 to seal chamber 34 and to prevent wear identifier 35 from being released through upper end 38. Plug 36 also permits chamber 34 to be easily filled during assembly.

Shaft step 14 contacts step washer 16 along wearing surface 26 and permits relative movement between shaft step 14 and step washer 16. As wearing surface 26 of shaft step 14 progressively wears away during operation of bearing assembly 10, wearing surface 24 approaches lower end 40 of chamber 34. Upon sufficient wear of wearing surface 26, wearing surface 26 breaches lower end 40 of chamber 34 to create an opening into chamber 34. As a result, wear identifier 35 is released onto wearing surface 26 and step washer 16 and into lubricant 20. Because wear identifier 35 is visually or chemically distinguishable from lubricant 20, shaft step 15 and step washer 16, wear identifier 35 permits easy detection of excessive wear of shaft step 14 through either visual inspection or chemical analysis of lubricant 20. Thus, the extent of wear upon shaft step 14 can be quickly and easily determined without bearing assembly 10 needing to be dismantled or taken out of service.

Because chamber 34 has a lower end which is conical-shaped, breach of lower end 40 is less likely to cause shaft step 14 to break up around lower end 40 of chamber 34. Because lower end 40 of chamber 34 is conical-shaped, an area of lower end 40 surrounding the opening of lower end 40 will have a greater thickness as compared to a flat lower end of chamber 34. As wearing surface 26 further wears, the opening or breach of lower end 40 will increase in size. However, the thickness of the area surrounding the opening will remain relatively thick. The conical shape of lower end 40 prevents particles from shaft step 14 from becoming dislodged into lubricant 20 between shaft step 14 and step washer 16. The conical shape of lower end 40 of chamber 34 prevents dislodgement of these particles and prevents damage to bearing assembly 10.

Step washer 16 is positioned between shaft step 14 and piston wearing plate 18 and includes contact surfaces 42, 44 and bore 46. Contact surface 42 is generally curved and extends along an upper end of step washer 16. Contact surface 42 is shaped to mirror wearing surface 26. Contact surface 42 contacts and partially frictionally engages wearing surface 26. Contact surface 42 supports and guides shaft step 14 and shaft 12, while permitting shaft step 14 and shaft 12 to move relative to step washer 16.

Contact surface 44 is generally flat and extends along a lower end of step washer 16. Contact surface 44 contacts and, at least partially frictionally engages piston wearing plate 18. Bore 46 extends through a center of step washer 16.

Piston wearing plate 18 includes wearing surface 48, non-wearing surface 50, bore 52 and wear indicator 53. Wearing surface 48 is generally flat and extends along an upper end of piston wearing plate 18. Wearing surface 48 contacts and, at least, partially frictionally engages contact surface 44 of step washer 16. Wearing surface 48 wears as a result of relative movement between step washer 16 and piston wearing plate 18. Non-wearing surface 50 is generally flat and is located opposite wearing surface 48. Non-wearing surface 50 may be integral with or may be coupled to a machine employing bearing assembly 10. Bore 52 extends through piston wearing plate 18.

Wear indicator 53 includes cavity or chamber 54, wear identifier 56 and plug 58. Chamber 54 extends into piston wearing plate 18 from non-wearing surface 50 toward wearing surface 48. Chamber 54 includes a lower end 60 and an upper end 62. Lower end 60 is positioned adjacent to non-wearing surface 50. Upper end 62 is positioned behind wearing surface 48 at a distance less than the distance at which catastrophic failure would occur. Upper end 62 is preferably tapered or conical in shape. Similar to chamber 34, chamber 54 contains wear identifier 56.

Wear identifier 56 preferably consists of a dye having a color distinguishable from lubricant 20. Alternatively, wear identifier 56 consists of a chemical or a foreign material distinguishable from lubricant 20 and materials used to form step washer 16 and piston wearing plate 18. Wear identifier 56 also is preferably distinguishable from wear identifier 35.

Plug 58 engages lower end 60 of chamber 54 to seal wear identifier 56 within chamber 54. Plug 58 is preferably threadably secured within lower end 60 of chamber 54. Alternatively, plug 58 is press-fit within lower end 60 of chamber 54.

Piston wearing plate 18 bears against step washer 16 and supports step washer 16, shaft step 14 and shaft 12. Wearing surface 48 of piston wearing plate 18 contacts step washer 16 and permits step washer 16 and piston wearing plate 18 to move relative to one another. As step washer 16 and piston wearing plate 18 move relative to one another during operation of step bearing assembly 10, wearing surface 48 progressively wears away until wearing surface 48 breaches upper end 62 of chamber 54 to create an opening into chamber 54. Because upper end 62 of chamber 54 is positioned behind wearing surface 48 at a distance less than the distance at which catastrophic failure occurs, wearing surface 48 breaches chamber 54 before catastrophic failure occurs. Upon breach of chamber 54, wear identifier 56 is released onto wearing surface 48 and contact surface 44 and into lubricant 20. Because wear identifier 56 is visually or chemically distinguishable from lubricant 20 and the materials used to form step washer 16 and piston wearing plate 18, breach of chamber 54 can be easily and quickly detected without requiring bearing assembly 10 to be disassembled. Thus, replacement of piston wearing plate 18 can be replaced at the end of its effective life, yet before wearing excessively to the point of catastrophic failure. In addition, because wear identifier 56 preferably is visually or chemically distinguishable from wear identifier 35, wear identifier 56 and wear identifier 35 indicate the location of excessive wear and the individual bearing component which needs replacement.

Lubricant 20 extends between wearing surface 26 and contact surface 42 and between contact surface 44 and wearing surface 48. As is conventionally known, lubricant 20 may be supplied by a circulating oil or lubricant system (not shown) wherein lubricant 20 is contained in an external tank and pumped to the wearing surfaces, after which lubricant 20 may also be filtered and cooled. Alternatively, lubricant 20 may be supplied as part of an oil or lubricant pool system (not shown) wherein lubricant 20 is contained in a lubricant housing or "well" and is filled to a fill level which submerges the wearing surface. In either case, lubricant 20 may be easily accessed for inspection without disassembling step bearing assembly 10. Consequently, excessive wear is easily detected by chemical or visual inspection of lubricant 20 within the external tank or by chemical or visual inspection of lubricant 20 drained from the lubricant housing or well. Lubricant 20 reduces friction between wearing surfaces 26 and 48 and contact surfaces 42 and 44, respectively. Lubricant 20 preferably consists of a petroleum-based or synthetic product as is conventionally known in the art.

Figure 2:
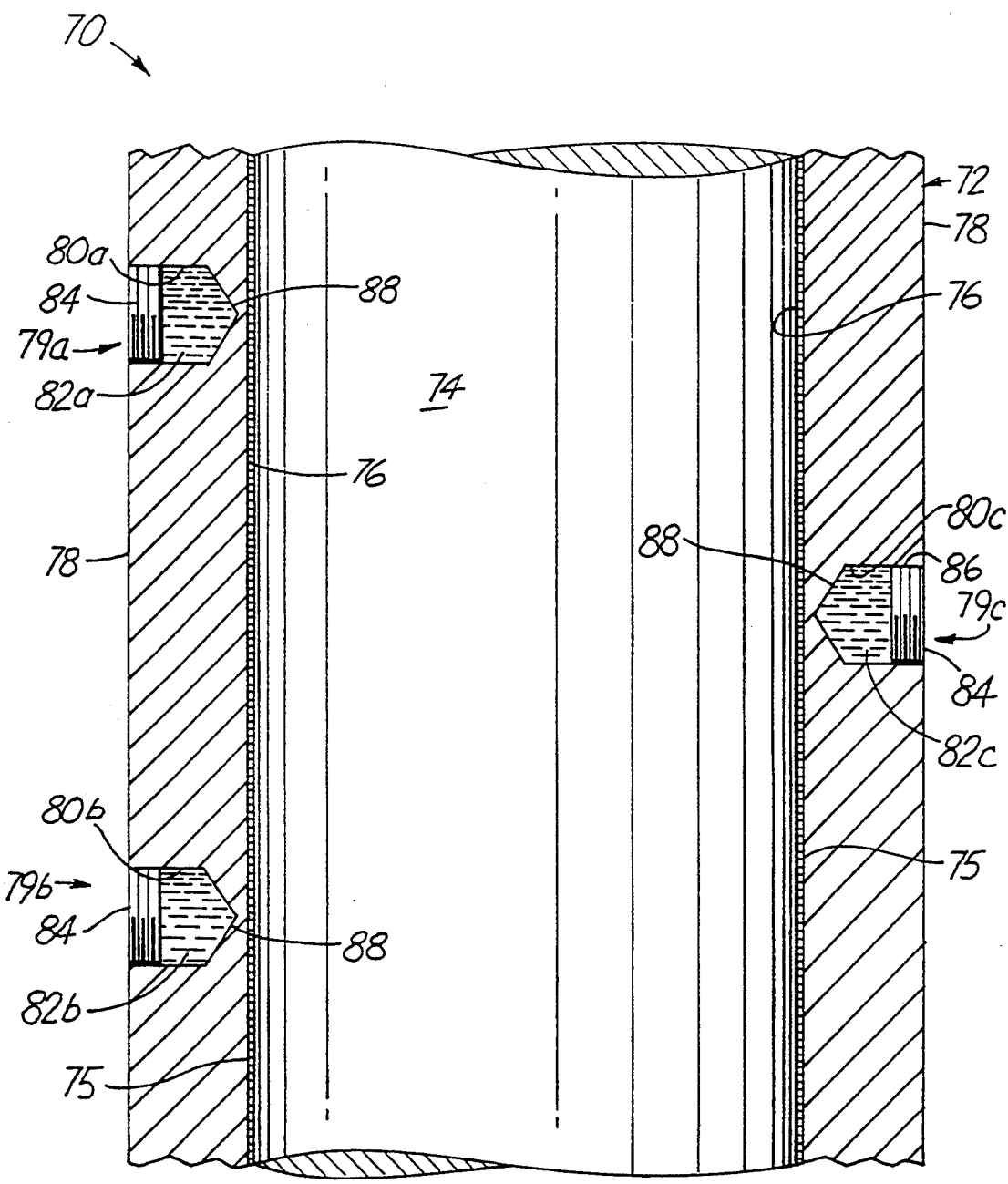
FIG. 2 is a cross-sectional view of a bushing bearing assembly including the bearing wear indicators of the present invention.

FIG. 2 is a cross-sectional view of bushing bearing assembly 70. Bushing bearing assembly 70 includes bushing 72 and rod or shaft 74. Bushing 72 consists of a tube or sleeve normally mounted to a case or a housing (not shown). Bushing 72 includes wearing surface 76, non-wearing surface 78 and wear indicators 79a, 79b, 79c. Wearing surface 76 consists of an inner surface of the tube comprising bushing 72. Wearing surface 76 surrounds an outer perimeter of shaft 74. Wearing surface 76 contacts and partially frictionally engages shaft 74. As a result, wearing surface 76 progressively wears from relative movement between bushing 72 and shaft 74.

Non-wearing surface 72 extends along an outer diameter of the tube comprising bushing 72. Non-wearing surface 78 is opposite of wearing surface 76.

Wear indicators 79a, 79b, 79c include cavities or chambers 80a, 80b, 80c, wear identifiers 82a, 82b, 82c, and plugs 84, respectively. Chambers 80a–80c extend into bushing 72 from non-wearing surface 78 toward wearing surface 76. Each of chambers 80a–80c includes an upper end 86 and a lower end 88. Upper end 86 is located adjacent non-wearing surface 78. Lower end 88 is positioned behind wearing surface 76 at a predetermined distance less than the distance at which catastrophic failure occurs. Lower end 88 is preferably tapered or conical-shaped, having a point pointing toward wearing surface 76. Chambers 80a–80c hold and contain wear identifiers 82a–82c, respectively.

Wear identifiers 82a–82c indicate when wearing surface 76 of bushing 72 has worn to a point where catastrophic failure may occur shortly. Wear identifiers 82a–82c preferably consist of a dye which is visually distinguishable from lubricant 75. Alternatively, wear identifiers 82a–82c consist of a chemical which is chemically distinguishable from lubricant 75. Preferably, wear identifiers 82a–82c are also visually or chemically distinguishable from each other.

Plugs 84 are fixedly coupled to lower end 86 of chambers 80a–80c. Plugs 84 are preferably threadably secured within lower end 86 of chambers 80. Alternatively, plugs 84 may be press-fit within lower ends 86 of chambers 80. Plugs 84 seal wear identifiers 82a–82c within chambers 80a–80c.

Lubricant 75 extends between bushing 72 and shaft 74. As is conventionally known, lubricant 75 may be supplied by a circulating oil or lubricant system (not shown) wherein lubricant 75 is contained in an external tank and pumped to the wearing surfaces, after which lubricant 75 may also be filtered and cooled. Alternatively, lubricant 75 may be supplied as part of an oil or lubricant pool system (not shown) wherein lubricant 75 is contained in a lubricant housing or "well" and is filled to a fill level which submerges the wearing surface. In either case, lubricant 75 may be easily accessed for inspection without disassembling bearing assembly 70. Thus, excessive wear is easily detected by chemical or visual inspection of lubricant 75 within the external tank or by chemical or visual inspection of lubricant 75 or drained from the lubricant housing or well. Lubricant 75 reduces friction between bushing 72 and shaft 74. Lubricant 75 preferably is a petroleum-based or synthetic product as is conventionally known in the art.

Bushing 72 guides the movement of shaft 74. As shaft 74 moves within bushing 72, wear surface 76 progressively wears away. Upon sufficient wear of wearing surface 76, wearing surface 76 breaches at least one of chambers 80a–80c to create an opening into at least one of chambers 80a–80c. As a result, at least one of wear identifiers 82a–82c is released from chamber 84 onto wearing surface 76 and shaft 74 and into lubricant 75. Because lower ends 88 of chambers 80a–80c are located behind wearing surface 76 at a distance less than the distance at which catastrophic failure would occur, wear identifiers 82a–82c are released before catastrophic failure occurs. Because wear identifiers 82a–82c are visually or chemically distinguishable from lubricant 75, excessive wear of bushing 72 can be quickly and easily detected without bushing bearing assembly needing to be disassembled or conventionally analyzed. In addition, because wear identifiers 82a–82c are also visually or chemically distinguishable from one another, an exact location of excessive wear in bushing 72 may be determined.

Furthermore, because lower ends 88 of chambers 80a–80c are conical or tapered in shape, bushing 72 is less likely to break apart around the opening into chambers 80a–80c. Thus, lower ends 88 of chambers 80a–80c prevent dislodgement of large bushing particles into lubricant 75 and between bushings 72 and 74 and prevents damage to bushing bearing assembly 70 caused by these particles.

Figure 3:
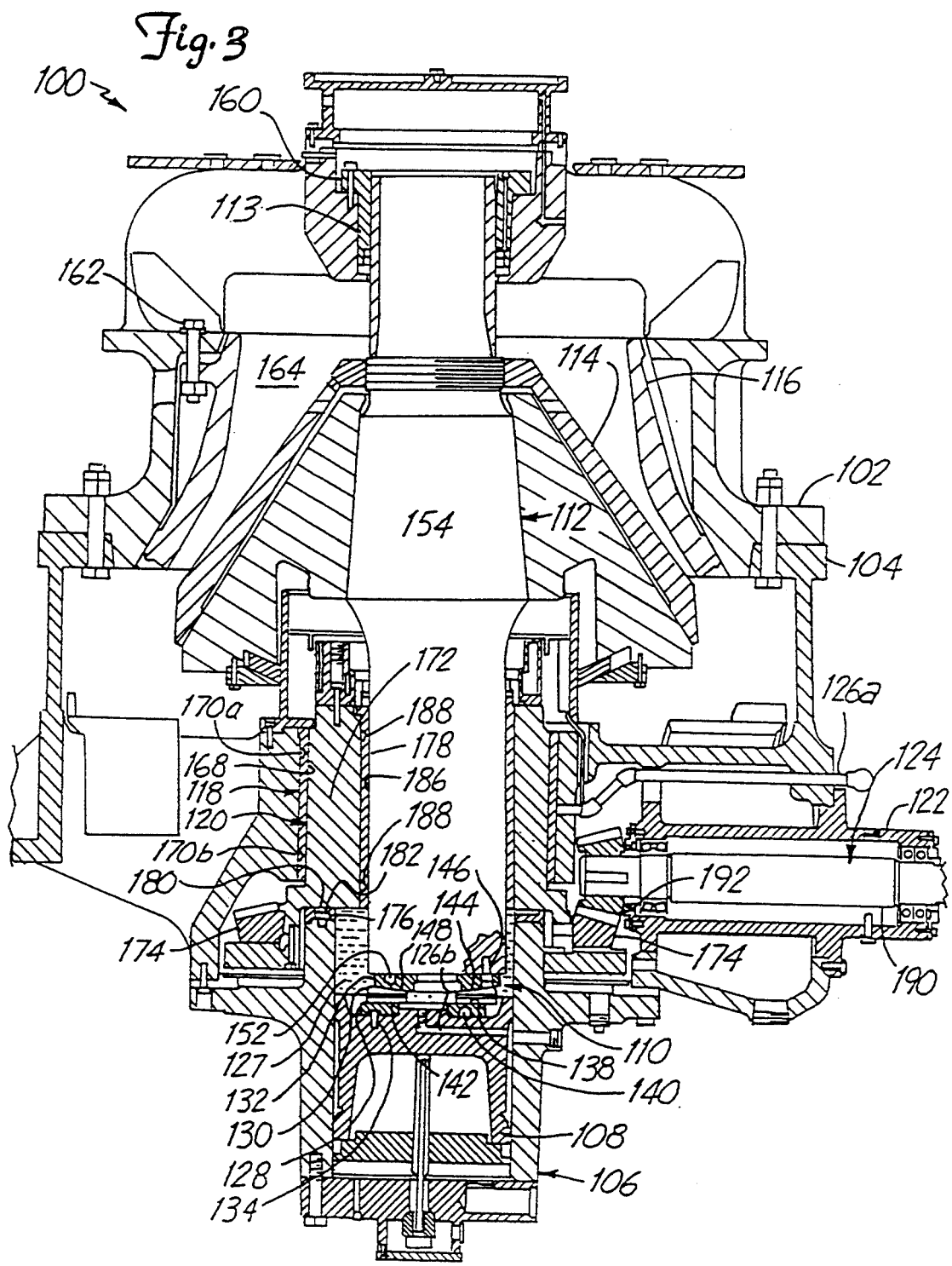
FIG. 3 is a cross-sectional view of a crusher employing bearing wear indicators of the present invention.

FIG. 3 shows a cross-sectional view of a gyratory crusher 100 including wear indicators of the present invention which are shown in greater detail in FIGS. 1 and 2. Gyratory crushers are commonly used for crushing and reducing the size of materials such as sand, gravel, ores and other virgin material. Crusher 100 includes top shell 102, bottom shell 104, hydroset cylinder 106, piston 108, step bearing assembly 110, main shaft 112, spider bushing 113, mantle 114, concave 116, bottom shell bushing 118, eccentric assembly 120, pinion shaft housing 122, pinion shaft 124, lube lines 126a, 126b and lubricant 127.

Top shell 102, bottom shell 104, and hydroset cylinder 106 are coupled together to form a casing or a housing for containing components of crusher 100. Top shell 102 and bottom shell 104 are coupled together to define an inner cavity for the reception of main shaft 112, mantle 114, concave 116, bottom shell bushing 118 and eccentric assembly 120. Hydroset cylinder 106 is coupled to a lower end of bottom shell 104 and houses piston 108.

Piston 108 is generally cylindrical and is guided within hydroset cylinder 106. Piston 108 vertically supports and maintains shaft 112 within top shell 102 and bottom shell 104. Piston 108 is hydraulically raised and lowered to vertically adjust shaft 112 and mantle 114.

Step bearing assembly 110 is coupled between piston 108 and shaft 112 and includes piston wearing plate 128, step washer 130, and shaft step 132. Step bearing assembly 110 is similar to step bearing assembly 10 shown in FIG. 1. Piston wearing plate 128 is preferably made from bronze. Piston wearing plate 128 is coupled to piston 108 by dowel 134. Piston wearing plate 128 includes wearing surface 138 and wear indicator 140. Wearing surface 138 is generally flat. Wearing surface 138 contacts and is partial frictional engagement with step washer 130. Wearing surface 138 wears as a result of relative movement between piston wearing plate 128 and step washer 130.

Wear indicator 140 is identical to wear indicator 63 shown in FIG. 1. Wear indicator 140 extends behind and toward wearing surface 138. Upon sufficient wear of wearing surface 138, wearing surface 138 breaches or opens wear indicator 140 to release a wear identifier onto wearing surface 138, step washer 130 and into lubricant 127.

Step washer 130 is positioned between piston wearing plate 128 and shaft step 132. Step washer 130 is preferably formed from a hardened alloy steel and includes contact surfaces 142, 144. Contact surface 142 is generally flat and extends along a lower end of step washer 130. Contact surface 142 contacts wearing surface 138 of piston wearing plate 128. Contact surface 142 moves relative to wearing surface 138. Contact surface 144 is generally arcuate and extends along an upper end of step washer 130. Contact surface 144 contacts shaft step 132. Contact surface 144 permits relative movement between shaft step 132 and step washer 130. Step washer 130 supports shaft step 132 and guides movement of shaft step 132 above step washer 130.

Shaft step 132 is coupled to main shaft 112 by doll pin 146 which prevents rotation. Shaft step 132 includes wearing surface 148 and wear indicator 152. Wearing surface 148 is generally arcuate and extends along a lower end of shaft step 132. Wearing surface 148 contacts and is in partial frictional engagement with step washer 130. As a result of relative movement between shaft step 132 and step washer 130, wearing surface 148 progressively wears away.

Wear indicator 152 extends behind and toward wearing surface 148. Wear indicator 152 is identical to wear indicator 33 shown in FIG. 1. Upon sufficient wear of wearing surface 148, wearing surface 148 breaches or opens wear indicator 152 to release a wear identifier onto wearing surface 148 and contact surface 144 and into lubricant 127. As a result, excessive wear of shaft step 132 can be quickly and easily identified through visual inspection or chemical analysis of lubricant 127 so that shaft step 132 may be replaced before wearing to a point of catastrophic failure.

Main shaft 112 extends above shaft step 132 through bottom shell 104 and top shell 102. Main shaft 112 includes cylinder 154. Cylinder 154 is coupled to mantle 114 and gyrates upon step bearing assembly 110 within eccentric assembly 120 and spider bushing 113.

Spider bushing 113 is secured to top shell 102 by bolt 160. Spider bushing is generally hourglass-shaped. Spider bushing 113 encircles the top end of cylinder 154 of main shaft 112. The top end of cylinder 154 gyrates within spider bushing 113. Spider bushing 113 guides the top end of cylinder 54 during operation of crusher 100.

Mantle 114 is fixedly secured to an intermediate portion of cylinder 154 of main shaft 112. Mantle 114 is generally conical-shaped. Mantle 114 is preferably formed from manganese steel. Mantle 114 cooperates with concave 116 to crush various materials.

Concave 116 generally consists of a hollow concave tube. Concave 116 is preferably formed from manganese steel. Concave 116 is coupled to top shell 102 by bolt 162. Concave 116 surrounds and partially encloses mantle 112. Concave 116 and mantle 114 define the crushing area 164. During operation of crusher 100, material is injected into crushing area 164. Gyration of main shaft 112 causes mantle 114 to gyrate with respect to concave 116. As a result, material within crushing space 164 is crushed and released toward a lower end of crushing space 164.

The gyration of main shaft 112 is caused by the rotation of eccentric assembly 120 within bottom shell bushing 118. Bottom shell bushing 118 generally consists of a thin tubular member having a wearing surface 168 and wear indicators 170a, 170b. Wearing surface 168 consists of an inner diameter of bushing 118 and contacts an outer perimeter of eccentric assembly 120. Wearing surface 168 guides rotation of eccentric assembly 120 within bushing 118. As a result of relative movement between eccentric assembly 120 and bushing 118, wearing surface 168 progressively wears.

Wear indicators 170a, 170b are similar to wear indicators 79a, 79b shown in FIG. 2. Wear indicators 170a, 170b extend behind and toward wearing surface 168. Upon sufficient wear of wearing surface 168, wearing surface 168 breaches or opens at least one of wear indicators 170a, 170b to release at least one wear identifier onto wearing surface 168 and eccentric assembly 120 into lubricant 127. Because the wear identifiers are visually distinguishable from lubricant 127, excessive wear of wearing surface 168 can be quickly and easily detected so that bushing 118 may be timely replaced before bushing 118 wears to a point of catastrophic failure. In addition, inspection of wear extent upon bushing 118 may be performed visually or through chemical analysis. Routine inspection does not require disassembly of bushing 118 from bottom shell 104. Because the wear identifiers are preferably distinguishable from one another location of excessive wear can also be easily identified.

Eccentric assembly 120 rotates within bushing 118 to cause main shaft 112 to gyrate. Eccentric assembly 120 includes eccentric 172, beveled gear 174, eccentric wearing plate 176 and eccentric bushing 178. Eccentric 172 generally consists of off-centered bore extending through a cylinder. Eccentric 172 has an outer diameter contacting wearing surface 168 of bushing 118. Eccentric 172 has an inner diameter in abutment with eccentric bushing 178. Eccentric 172 partially surrounds cylinder 154 of main shaft 112. Cylinder 154 extends through the off-centered bore of eccentric 172. As a result, rotation of eccentric 172 causes main shaft 112 to reciprocate in a rectilinear motion or gyrate.

Beveled gear 174 is conventionally known in the art and is coupled to a lower end of eccentric 172. Rotation of beveled gear 174 causes eccentric 172 to rotate.

Eccentric wearing plate 176 is secured to hydroset cylinder 106. Wearing plate 176 is preferably formed from bronze. Wearing plate 176 includes wearing surface 180 and wear indicator 182. Wearing surface 180 is generally flat and contacts the lower end of eccentric 172. As a result of relative movement between rotating eccentric 172 and wearing plate 176, wearing surface 180 progressively wears down.

Wear indicator 182 is identical to wear indicator 53 shown in FIG. 1. Wear indicator 182 extends behind and toward wearing surface 180. Upon excessive wear of wearing surface 180, wearing surface 180 breaches wear indicator 182 to release a wear identifier onto wearing surface 180 and eccentric 172 and into lubricant 127. As a result, excessive wear upon wearing plate 176 can be quickly and easily detected, visually or through chemical analysis, without wearing plate 176 needing to be dismantled in crusher 100.

Eccentric bushing 178 generally consists of a tube preferably formed from bronze. Eccentric bushing 178 is preferably press-fit to the inside diameter of eccentric 172. Eccentric bushing 178 includes wearing surface 186 and wear identifiers 188. Wearing surface 186 extends along an inner diameter of bushing 178. Wearing surface 186 contacts and partially frictionally engages cylinder 154 of main shaft 112. Wearing surface 186 guides movement of main shaft 112. As a result of relative movement between main shaft 112 and bushing 178, wearing surface 186 progressively wears down.

Wear indicators 188 are identical to wear indicators 79a, 79b shown in FIG. 2. Wear indicators 79a, 79b extend behind and toward wearing surface 186. Upon excessive wear of wearing surface 186, wearing surface 186 breaches at least one of wear indicators 188 to release at least one wear identifier onto wearing surface 186 and main shaft 112 and into lubricant 127. As a result, excessive wear of bushing 178 can be quickly and easily detected by visual inspection or through chemical analysis of lubricant 127 without bushing 178 needing to be dismantled from crusher 100.

Pinion housing 122 is coupled to bottom shell 104 and hydroset cylinder 106. Pinion housing 122 houses and contains pinion shaft 124.

Pinion shaft 124 extends through pinion housing 122 and includes drive shaft 190 and beveled gear 192. Drive shaft 190 extends through housing 122. Drive shaft 190 has a first end coupled to a source of power for rotating pinion 124. Drive shaft 190 has a second end coupled to beveled gear 192. Beveled gear 192 is conventionally known in the art. Beveled gear 192 engages beveled gear 174. Upon rotation of drive shaft 190, beveled gear 192 engages beveled gear 174 to rotatably drive eccentric 172 of eccentric assembly 120. Rotation of eccentric assembly 120 causes main shaft 112 to gyrate above step beating assembly 110. As a result, material contained within crushing area 164 is crushed between mantle 114 and concave 116.

Lube line 126a and lube line 126b are part of an overall circulating lubricant system. Lube line 126a extends through bottom shell 104 and is in communication with an interior of bottom shell 104. Lube line 126a supplies lubricant 127 to points between bottom shell bushing 118 and eccentric 172. Lube line 126b supplies lubricant 127 to points between piston wearing plate 128 and step washer 130, between step washer 130 and shaft step 132, between main shaft 112 and eccentric bushing 178, and between eccentric wearing plate 176 and eccentric 172. As a result, lubricant 127 may be easily accessed for inspection without disassembling crusher 100. Excessive wear of any of the wearing surfaces is easily detected by chemical or visual inspection of lubricant 127 contained within an external tank (not shown) of the circulating lubricant system. Lubricant 127 reduces friction between moving members of crusher 100. Lubricant 127 preferably consists of a petroleum-based or synthetic product as is conventionally known in the art.

Main shaft 112 is supported and guided by step bearing assembly 110 and eccentric bushing 178. At the same time, eccentric 172 of eccentric assembly 120 is supported and guided by eccentric bearing plate 178 and bottom shell bushing 118. Because piston wearing plate 128, shaft step 132, bottom shell bushing 118, eccentric bushing 178 and eccentric wearing plate 176 include wear indicators, excessive wear of these components can be quickly and easily detected through a visual inspection or through chemical analysis of lubricant 127. Routine inspection of these components can be performed without disassembling crusher 100. As a result, crusher 100 does not need to be shut down for inspection or shut down due to catastrophic failure caused by excessive wear.

As can be appreciated, the wear indicators of the present invention may be located in a variety of locations behind wearing surfaces so that a specific amount of wear upon a wearing surface is indicated by the release of the wear identifier. For example, multiple chambers of the wear indicators can be placed at different distances behind the wearing surface. The extent of wear upon the wearing surface can be precisely determined based upon the individual wear identifier that is released. Thus, in addition to identifying excessive wear and the location of excessive wear, the wear indicators of the present invention may be used to indicate the precise extent of wear upon the bearing member.

Although the present invention has been described with reference to preferred embodiments, workers skilled in the art will recognize that changes may be made in form and detail without departing from the spirit and scope of the invention.

What is claimed is:

1. A bearing assembly for supporting and guiding a moving member, the bearing assembly comprising:
   a first bearing member; and
   a second bearing member for movement relative to the first bearing member, the second bearing member comprising:
   a wearing surface in contact with the first bearing member for wearing in response to relative movement between the first and second bearing members;
   a chamber within the second bearing member behind the wearing surface, the chamber including:
   a cavity having a first end and a second end, the first end positioned near the wearing surface; and
   a plug engaging the second end for sealing the cavity; and
   a wear identifier within the chamber, whereupon sufficient wear of the wearing surface, the wear identifier is released from the chamber onto the wearing surface.

2. The assembly of claim 1 wherein the first end of the cavity is conical and extends toward the wearing surface.

3. The assembly of claim 1 wherein the wear identifier comprises a dye.

4. The assembly of claim 1 wherein the wear identifier comprises a chemical.

5. The assembly of claim 1 and further including a lubricant between the first bearing member and the second bearing member.

6. The assembly of claim 5 wherein the wear identifier is visually distinguishable from the lubricant.

7. The assembly of claim 6 wherein the wear identifier is chemically distinguishable from the lubricant.

8. The assembly of claim 1 wherein the first bearing member comprises a step washer and wherein the second bearing member comprises a shaft step.

9. The assembly of claim 1 wherein the first bearing member comprises a step washer and wherein the second bearing member comprises a piston-wearing plate.

10. The assembly of claim 1 wherein the first bearing member comprises a shaft and wherein the second bearing member comprises a bushing.

11. The assembly of claim 1 wherein the first bearing member comprises an eccentric and wherein the second bearing member comprises a bushing.

12. The assembly of claim 1 wherein the first end of the cavity is positioned near the wearing surface at a predetermined distance behind the wearing surface.

13. The assembly of claim 12 wherein catastrophic failure occurs at a failure distance behind the wearing surface and wherein the predetermined distance is less than the failure distance.

14. A bearing assembly for supporting and guiding a moving member, the bearing assembly comprising:
   a first bearing member; and
   a second bearing member for movement relative to the first bearing member, the second bearing member comprising: a wearing surface in frictional engagement with the first bearing member for wearing in response to relative movement between the first and second bearing members;

a plurality of chambers within the second bearing member behind the wearing surface; and a plurality of different wear identifiers, each different wear identifier contained within one of the plurality of chambers, whereupon sufficient wear of the wearing surface, a different wear identifier is released from one of the plurality of chambers onto the wearing surface to indicate where excessive wear has occurred.

15. The assembly of claim 14 wherein each chamber comprises a cavity having a conical end extending toward the wearing surface.

16. The assembly of claim 14 wherein each chamber comprises:

a cavity having a first end and a second end, the first end positioned near the wearing surface; and a plug engaging the second end for sealing the cavity.

17. The assembly of claim 14 wherein the plurality of different wear identifiers comprise a plurality of different dyes.

18. The assembly of claim 14 wherein the plurality of different wear identifiers comprise a plurality of different chemicals.

19. The assembly of claim 14 and further including a lubricant between the first bearing member and the second bearing member.

20. The assembly of claim 19 wherein the plurality of different wear identifiers are visually distinguishable from the lubricant.

21. The assembly of claim 19 wherein the plurality of different wear identifiers are chemically distinguishable from the lubricant.

22. In a bearing assembly for supporting and guiding a moving member, the bearing assembly having a first bearing member and a second bearing member which moves relative to the first bearing member and has a wearing surface in contact with the first bearing member for wearing in response to relative movement between the first and second bearing members, an improvement comprising:

a cavity defined by the second bearing member behind the wearing surface, the cavity having a conical end extending toward the wearing surface; and a wear identifier within the cavity, whereupon sufficient wear of the wearing surface, the wear identifier is released from the cavity onto the wearing surface.

23. A wear identifying bearing member for movement relative to an adjacent surface, the bearing member comprising:

a wearing surface configured for being held in contact with the adjacent surface and for wearing in response to relative movement between the bearing member and the adjacent surface;

a cavity within the bearing member behind the wearing surface, the cavity having a conical end extending toward the wearing surface; and a wear identifier within the cavity, whereupon sufficient wear of the wearing surface, the wear identifier is released from the cavity onto the wearing surface.

24. A wear identifying bearing member for movement relative to an adjacent surface, the bearing member comprising:

a wearing surface configured for being held in contact with the adjacent surface and for wearing in response to relative movement between the bearing member and the adjacent surface;

a plurality of chambers behind the wearing surface; and a plurality of different wear identifiers, each different wear identifier contained within one of the plurality of chambers, whereupon sufficient wear of the wearing surface, a different wear identifier is released from one of the plurality of chambers onto the wearing surface to indicate where excessive wear has occurred.

25. In an apparatus having a plurality of bearing members, each bearing member having a wearing surface held in contact with an adjacent surface and wearing in response to relative movement between the bearing member and the adjacent surface, an improvement comprising:

a plurality of chambers, each chamber located behind the wearing surface of a different one of the plurality of bearing members; and a plurality of different wear identifiers, each different wear identifier contained within one of the plurality of chambers, whereupon sufficient wear of the wearing surface of one of the plurality of bearing members, one of the plurality of different wear identifiers is released from one of the plurality of chambers onto the wearing surface to indicate which one of the plurality of bearing members has experienced excessive wear.

* * * * *

UNITED STATES PATENT AND TRADEMARK OFFICE
CERTIFICATE OF CORRECTION

PATENT NO. : 5,451,110
DATED : September 19, 1995
INVENTOR(S) : FERDINAND L. GAMS, JR., DONALD J. POLINSKI It is certified that error appears in the above-indentified patent and that said Letters Patent is hereby corrected as shown below:

On the title page, item [73], delete "Syedala", and insert
--Svedala--.

Signed and Sealed this

Twentieth Day of February, 1996

Attest:

BRUCE LEHMAN

*Attesting Officer*     *Commissioner of Patents and Trademarks*